W. H. HUTCHINSON.
COOKING DEVICE.
APPLICATION FILED SEPT. 25, 1913.
1,226,771.
Patented May 22, 1917.
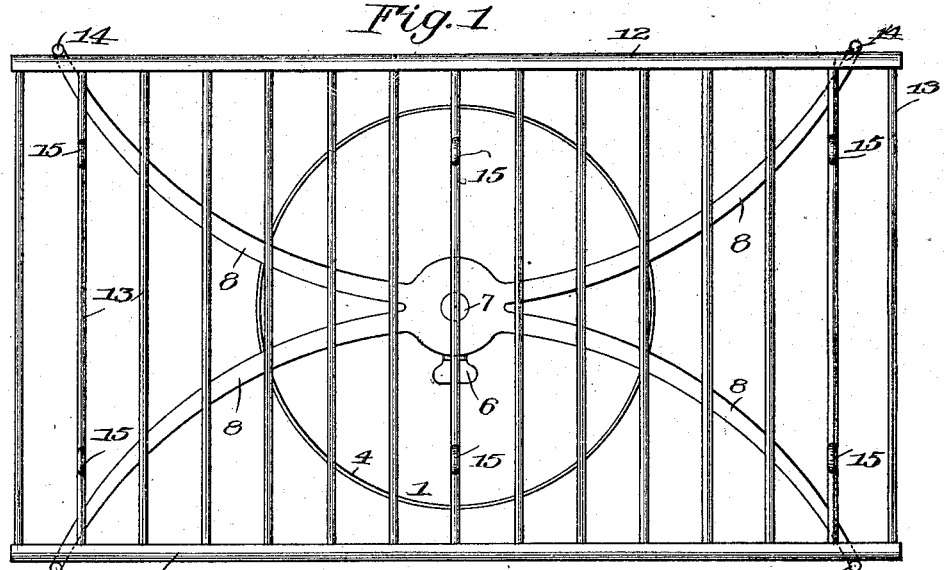
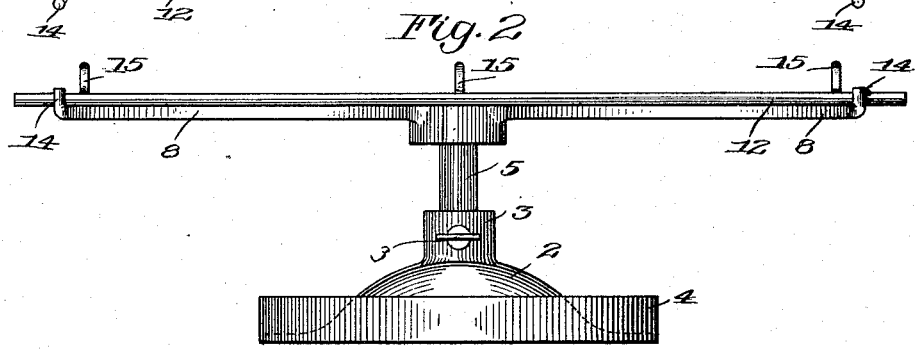
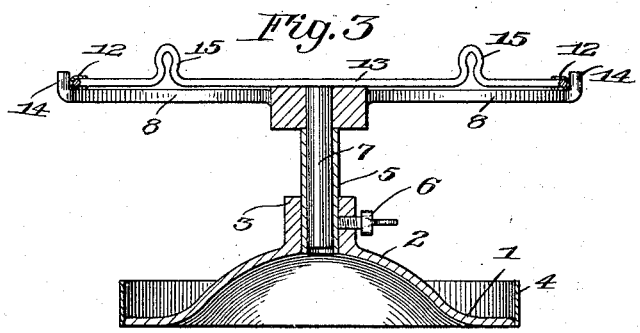
Inventor
William H. Hutchinson
Witnesses
By his Attorneys

UNITED STATES PATENT OFFICE.

WILLIAM H. HUTCHINSON, OF ROCHESTER, NEW YORK.

COOKING DEVICE.

1,226,771.  Specification of Letters Patent.  Patented May 22, 1917.

Application filed September 25, 1913. Serial No. 791,681.

*To all whom it may concern:*

Be it known that I, WILLIAM H. HUTCHINSON, of Rochester, in the county of Monroe and State of New York, have invented certain new and useful Improvements in Cooking Devices; and I do hereby declare the following to be a full, clear, and exact description of the same, reference being had to the accompanying drawings, forming a part of this specification, and to the reference-numerals marked thereon.

My invention relates to cooking devices for ovens and stoves, and while applicable to various uses in the preparation of different foods, it is designated more particularly for roasting and broiling meats, and it has for its primary purpose to provide convenient means for supporting the meat while it is in the oven or near the fire, and for changing its position readily, so that all parts of the meat may be subjected to the same degree of heat. To these and other ends the invention consists in certain improvements and combinations of parts all as will be hereinafter more fully described, the novel features being pointed out in the claims at the end of the specification.

In the drawings:

Figure 1 is a plan view of a device constructed in accordance with my invention;

Fig. 2 is a side elevation;

Fig. 3 is a transverse vertical sectional view.

Similar reference numerals in the several figures indicate the same parts.

According to the present embodiment, my invention comprises a base 1 provided with a central dome-shaped portion 2. Formed at the top is a socket 3, the base being further provided with a detachable flange 4, which is adapted to be employed when roasting meat in a pudding to hold the pudding away from the base. Arranged within the socket 3 is a sleeve designated at 5, arranged to be adjusted vertically within the socket and held in any desired position of adjustment by means of a thumb screw 6.

The grid, which will be described presently, is arranged on a support comprising a post 7 in engagement with the sleeve 5. Secured to said post is a frame embodying a pair of spring arms or members 8, adapted to hold the grid removably in position as will be described presently. The carrier for the articles to be cooked, in the present instance, consists of the grid comprising side bars 12, connected by transverse wires 13 which are arranged preferably in parallel relation to each other, although it will be understood that the invention is not limited to this particular form of meat support. The grid is held removably in engagement upon the support before referred to, and to this end, the latter is provided with a series of projections or lugs, which engage the outer edges of the side bars 12 as shown, with sufficient friction to prevent ready removal of the grid. The tension of the spring arms against the projections or lugs 14 is sufficient to hold the grid ordinarily in operative position, but when desired, it can be removed by a slight outwardly directed pressure against the ends of the spring arms. In order to hold the meat upon the grid, and to prevent it from sliding off when the grid is rotated, I provide the grid with a series of upward projections which serve to retain the roast or other article with sufficient stability to prevent its accidental removal or displacement. These are preferably in the form of integral lugs formed in the cross wires 13 by bending the latter upon themselves as designated at 15.

The chief advantages of my improvement consist in permitting any portion of the meat to be brought in contact with the hottest part of the heated area by simply turning the support in the socket 5; further in enabling the grid which carries the meat or other articles to be cooked, to be readily removed from its position upon the support; and finally in the simplicity and cheapness of manufacture of the device.

I claim as my invention:

1. The combination with a base embodying a socket, of a support adjustably arranged in the socket and embodying a plurality of spring arms, and a grid held frictionally in a horizontal position by said spring arms.

2. The combination with a base embodying a socket, of a support adjustably arranged in the socket and embodying pairs of oppositely disposed spring arms, and a grid held frictionally in a horizontal position by said spring arms and removable from the support.

WILLIAM H. HUTCHINSON.

Witnesses:
RUSSELL B. GRIFFITH,
WALTER B. PAYNE.

Copies of this patent may be obtained for five cents each, by addressing the "Commissioner of Patents, Washington, D. C."